US012636837B2

(12) United States Patent
Jahangir et al.

(10) Patent No.: US 12,636,837 B2
(45) Date of Patent: May 26, 2026

(54) COMPUTER-IMPLEMENTED CORRELATION BETWEEN MONITORING DATA AND ACCORDING INSPECTION DATA IN POWDER-BED ADDITIVE MANUFACTURING

(71) Applicant: Siemens Energy Global GmbH & Co. KG, Bayern (DE)

(72) Inventors: Hamid Jahangir, Aachen (DE); Vivian Schiller, Stuttgart (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 652 days.

(21) Appl. No.: 18/014,791

(22) PCT Filed: Jun. 8, 2021

(86) PCT No.: PCT/EP2021/065219
§ 371 (c)(1),
(2) Date: Jan. 6, 2023

(87) PCT Pub. No.: WO2022/028753
PCT Pub. Date: Feb. 10, 2022

(65) Prior Publication Data
US 2024/0239049 A1     Jul. 18, 2024

(30) Foreign Application Priority Data
Aug. 5, 2020     (EP) ..................................... 20189547

(51) Int. Cl.
B29C 64/393        (2017.01)
B29C 64/268        (2017.01)
(Continued)

(52) U.S. Cl.
CPC .......... *B29C 64/393* (2017.08); *B29C 64/268* (2017.08); *B33Y 50/02* (2014.12); *B29C 64/153* (2017.08); *B33Y 10/00* (2014.12)

(58) Field of Classification Search
CPC ... B29C 64/393; B29C 64/268; B29C 64/153; B33Y 50/02; B33Y 10/00; B33Y 50/00;
(Continued)

(56) References Cited

U.S. PATENT DOCUMENTS

2018/0099333 A1*   4/2018   DehghanNiri .......... B22F 10/37
2020/0160497 A1    5/2020   Shah

FOREIGN PATENT DOCUMENTS

CN        109532021 A      3/2019

OTHER PUBLICATIONS

PCT International Search Report and Written Opinion of International Searching Authority mailed Sep. 21, 2021 corresponding to PCT International Application No. PCT/EP2021/065219 filed Jun. 8, 2021.

(Continued)

*Primary Examiner* — Michael J Brown
(74) *Attorney, Agent, or Firm* — Wolter Van Dyke Davis, PLLC

(57)        ABSTRACT

A computer-implemented method of correlating monitoring data and post-manufacturing inspection data in powder-bed-based additive manufacturing of workpieces includes (a) providing monitoring data including anomaly detection information of a workpiece's geometry in a layerwise domain, (b) providing inspection data including defect information of the workpiece's geometry in a volumetric domain,
(Continued)

(c) extracting a region-of-interest information from the monitoring data, and, either, (d1) transforming the defect information of the inspection data from the volumetric domain into the layerwise domain, or, (d2) transforming the anomaly detection information of the monitoring data from the layerwise domain into the volumetric domain, as well as, (e) computing a spatial overlap of the monitoring data of interest and the transformed inspection data.

13 Claims, 6 Drawing Sheets

(51) Int. Cl.

| | |
|---|---|
| *B33Y 50/02* | (2015.01) |
| *B22F 10/28* | (2021.01) |
| *B29C 64/153* | (2017.01) |
| *B33Y 10/00* | (2015.01) |
| *H04N 1/409* | (2006.01) |

(58) Field of Classification Search
CPC .......... Y02P 10/25; B22F 10/00; B22F 10/10;
B22F 10/28; B22F 10/80; H04N 1/409
USPC ....................................................... 700/119
See application file for complete search history.

(56) References Cited

OTHER PUBLICATIONS

Meng, Lingbin et al.; "Machine Learning in Additive Manufacturing: A Review"; JOM: Journal of Metals; Springer New York LLC; vol. 72; No. 6; pp. 2363-2377; XP037137451; ISSN: 1047-4838; DOI: 10.1007/S11837-020-04155-Y; 2020.

Mireles, Jorge et al: "Analysis and correction of defects within parts fabricated using powder bed fusion technology". Surface Topography: Metrology and Properties. Bd. 3, Nr. 3, Seite 034002, XP055607124, DOI: 10.1088/2051-672X/3/3/034002; 2015.

Mitchell, John A. et al: "Linking pyrometry to porosity in additively manufactured metals"; Additive Manufacturing; vol. 31; p. 100946; XP055758131; ISSN: 2214-8604; DOI: 10.1016/j.addma.2019.100946; 2019.

Gobert, Christian et al: "Application of supervised machine learning for defect detection during metallic powder bed fusion additive manufacturing using high resolution imaging.", Additive Manufacturing, vol. 21, pp. 517-528, XP055601582, NL; ISSN: 2214-8604, DOI: 10.1016/j.addma.2018.04.005; 2018.

Zhang Jian-Guo, Digital Intelligent Radiotherapy, Ntaional Science and Technology Academic Writings Publishing Fun funded publication, Dec. 2019, p. 89, Shandong Science and Technology Publishing House [English machine translation attached].

* cited by examiner (i)          (ii)          (iii)

$$IoU = \frac{A_o}{A_u}$$

COMPUTER-IMPLEMENTED CORRELATION BETWEEN MONITORING DATA AND ACCORDING INSPECTION DATA IN POWDER-BED ADDITIVE MANUFACTURING

CROSS REFERENCE TO RELATED APPLICATIONS

This application is the US National Stage of International Application No. PCT/EP2021/065219 filed 8 Jun. 2021, and claims the benefit thereof. The International Application claims the benefit of European Application No. EP20189547 filed 5 Aug. 2020. All of the applications are incorporated by reference herein in their entirety.

FIELD OF INVENTION

The present invention relates to a computer-implemented method for correlating monitoring data and according inspection data in powder-bed-based additive manufacturing. Accordingly, the presented solution may relate to in-situ monitoring and/or post-processing of data rendered during and after the additive manufacture of any kind of components or workpieces.

Such workpieces may denote high-performance components, such as a component applied in power generation, aerospace or the automotive sector. The component may as well be a component of a turbo machine, e.g. in the flow path hardware of a gas turbine. The component is, thus, preferably made of a nickel- or cobalt-based superalloy, particularly a precipitation hardened alloy.

The given approach is generally applicable for all types of powder-bed-based additive manufacturing processes, such as for processing plastics, ceramics or metals. Most preferably, the presented solution is applicable to the additive manufacture of parts or workpieces established by laser powder bed fusion (LPBF) out of a powder bed. Such additive manufacturing techniques generally comprise at least selective laser melting (SLM), selective laser sintering (SLS) and electron beam melting (EBM). Further suitable additive manufacturing approaches relate to "Directed Energy Deposition (DED)", such as laser cladding, electron beam or plasma welding, metal inkjet molding (MIM), so-called sheet lamination methods, or thermal spraying (VPS, LPPS) methods, cold spraying (GDCS).

BACKGROUND OF INVENTION

Additive manufacturing (AM), also known as 3D-printing, particularly powder-bed methods have proven to be useful and advantageous in the fabrication of prototypes or complex components, such as components with a mazelike or convoluted structure or functionally cooled components. Further, the additive manufacture stands out for its short chain of process steps which in turn enables material economization and a particularly low lead time.

Powder-bed-fusion manufacturing devices or setups for the given methods usually comprise a manufacturing or build platform on which the component is built layer-by-layer after the feeding of a layer of base material which may then be melted, e.g. by an energy beam, such as a laser, and subsequently solidified. The layer thickness is determined by a recoater that moves, e.g. automatically, over the powder bed and removes excess material from a manufacturing plane or build space. Typical layer thicknesses amount to between 20 μm and 40 μm. During the manufacture, said energy beam scans over the surface and melts the powder on selected areas which may be predetermined by a CAD-file according to the geometry of the component to be manufactured. Said scanning or irradiation is, preferably, carried out in a computer implemented way or via computer-aided means, such as computer aided manufacturing (CAM) instructions, which may be present in the form of a dataset. Said dataset or CAM-file may be or refer to a computer program or computer program product.

Such manufacturing devices are usually equipped with different types of optical process monitoring systems, such as CCD or sCMOS cameras or (other) photodiode-based systems. These systems generate layerwise images, such as photos or optical tomography recordings, of the workpiece during its build-up. These images usually need to be analysed for anomalies, such as so-called hot spots, cold spots, over- or underexposed regions, or other anomalies. These anomalies often lead to defects the workpiece's structure which are crucial to the workpieces service.

Due to the complexity of the mentioned selective melting (welding) processes such anomalies or defects are likely to occur during the buildup of any component. If such defects were not detected early on, this would probably lead to scrapping of the part and to a waste of process capacity and manufacturing time.

The assurance or improvements of quality standards as well as reproducibility in the disruptive additive manufacturing field is the main cost driven factor. Extensive research is being conducted to find new processes and solutions to address the challenges that are rising in the industrialisation of additive approaches. Currently, to ensure the quality of any additive manufactured or 3D-printed part, costly post-manufacturing inspection methods are used, such as computed tomography. With the advancement of AM, new in-situ process monitoring technologies are being developed and investigated to address the quality-related challenges.

In-situ process monitoring systems are e.g. used to detect early defects during the parts "print", so that post-inspection efforts can be reduced to a reasonable minimum in order to predict relevant material defects. However, these process monitoring systems still lack maturity to predict material quality by relying only on the predictions made under generated data. In order to assure that the predicted or detected defects have a relation with a real material defects, post-inspection data, such as computed tomography data or images and data from e.g. vision-based process monitoring must be correlated. However, currently there are no robust correlation solutions available, which would allow the development of understanding of defect emergence and formation.

Currently, there is thus the stringent demand to obtain more technical insight in the digital AM technology by using the tremendous data amounts available.

Currently, at most any correlation between a predicted or detected defect from layerwise process monitoring data is done manually by looking into any computed tomography volume data or metallography cuts in a manual way.

SUMMARY OF INVENTION

It is an object of the present invention to provide means to fulfil the mentioned technical demands and/or to tackle the technical problems set forth herein.

The mentioned object is achieved by the subject-matters of the independent claims. Advantageous embodiments are subject-matter of the dependent claims.

An aspect of the present invention relates to a computer-implemented method of correlating or mapping monitoring data and, particularly post-manufacturing, inspection data in powder-bed-based additive manufacturing of workpieces.

The method comprises providing or importing (recorded) monitoring data comprising anomaly (detection) information of a workpiece's geometry in a layerwise, such as quasi-two-dimensional, (2D) domain. Said monitoring data may thus relate to a stack of images, such as recorded during an additive build job.

The method further comprises providing, or giving as an input, inspection data, such as post-manufacturing inspection data comprising defect information of the workpiece's geometry in a volumetric, such as quasi-three-dimensional (3D) domain.

The term "inspection data" preferably relates to data rendered offline (ex-situ) from the actual manufacturing process, such as after the structure of the workpiece has already been provided. On the contrary, the term "monitoring data" preferably relates to in-situ rendered data recorded during the additive manufacturing process of the workpiece.

The method further comprises extracting a region-of-interest information from the monitoring data and, either transforming that defect information of the inspection data from the volumetric domain into a (the) layerwise or image domain; or, transforming the anomaly detection information of the monitoring data from the layerwise domain into the volumetric domain. Said transformation may e.g. be carried out using suitable geometric operations, but preferably not so-called affine transformations, as the latter approaches are considered too complex an inefficient.

The method further comprises computing a spatial overlap or intersection of the monitoring data of interest and the transformed inspection data, such as process monitoring computed tomography (slice) data.

With the given methodology, particularly during or based on the computing step, it is advantageously possible to derive parameters like a total or partial defect volume or anomaly volume, the overall number of detected pores or defects and the like. Therewith, in turn, an in-depth understanding between (via process monitoring) predicted defects and real structural or material defects in the as-manufactured workpiece can be obtained. This is because of the information gathered from the spatial or geometric overlap information.

Due to the direct correlation of the given data inputs, it is particularly possible to gather deep knowledge about the link between monitored anomalies during the AM process and post-manufacturing recorded structural defects of the workpiece. Furthermore, validation of computer vision systems may be improved or machine learning or artificial intelligence algorithms be fed with the computed results of the presented approach. Moreover, this brings significant advances for digital twin manufacturing development and/or to bring multiple data sources onto a single data structure or platform in order to perform further in-depth analysis to support new printing parameters development and quality assurance.

As well, quality of the printed parts can better be assured from all aspects within the AM-process chain, hence the present invention even allows to improve concepts for digital certification in the digital manufacturing technology.

In an embodiment the monitoring data are provided as unstructured and/or on labelled data, such as in form of a point cloud or point cloud database.

In an embodiment, the anomaly detection information comprises a location, such as a global position or field of view information, a size and/or a severity information of the respectively detected anomaly. This particularly allows to maximise the merit of the presented correlation approach as the anomaly information being mapped is maximised; and so is the output of the correlation.

In an embodiment an anomaly relates to or is constituted by a hot spot, a cold spot, a blob defect, an overexposed and/or an underexposed region detected via the monitoring, such as optical tomography and/or melt pool analysis, during the manufacture of the given workpiece.

In an embodiment an anomaly is detected or predicted using a combination of machine learning and image processing algorithms. To this effect, the anomaly detection may be carried out by an e.g. thresholding based, semi-supervised, or adapted methodology. According to this embodiment the presented correlation approach may be implemented most expediently.

In an embodiment the inspection data comprise or constitute computed tomography data and the defect information indicates a porosity or a lack-of-fusion defect of the workpiece's structure in the as-manufactured state.

In an embodiment, for the computation of the spatial overlap, either a pixel-wise or a region-wise overlapping type of analysis is carried out. E.g. depending on the computational effort spent or the time required for computing, one of the given alternatives may be selected, either automatically or based on an operator input. Expectedly, e.g. the pixel-wise type of analysis offers a more accurate computational information than the region-wise overlapping. However, said pixel-wise overlapping is usually slower in computing, whereas the region-wise overlapping stands out for an efficient computation.

In an embodiment, after the extraction of the region-of-interest information, spatial coordinates for the region-of-interest of the monitoring data are adjusted. Said adjustment is not essential to the presented correlation approach, but may be advantages, such as if coordinates of a single defect or defect cluster are geometrically and not well adjusted. Then, a "best fit" automated or semi-automated alignment method may be applied such as comprising an offset and/or a rotation operation.

In an embodiment the computation of the overlap is supported by defining a bounding box of the monitoring data and the inspection data each, and, by way of said bounding boxes, the overlap is calculated via an area-of-overlap and/or an area-of-union of the monitoring data and inspection data, respectively. By these means, the computation may be carried out in an easy as well as accurate way.

In an embodiment the inspection data are converted into an STL (stereolithography) or a VRML format or by any other format native to computer-aided-design (CAD). According to this embodiment, the inspection data may expediently be brought in the same data structure or domain as is usual for providing a workpiece's design prior to a given manufacturing job.

In an embodiment the monitoring data are automatically cropped and only the extracted region-of-interest information is further mapped. Thereby, the computation may be focused on that relevant portion of data which is relevant any further for the correlation or overlap computation.

In an embodiment, for the transforming, either a voxel-to-pixel conversion or a pixel-to-voxel conversion is carried out with the mapped monitoring data.

In an embodiment, the powder-bed-based additive manufacture as mentioned relates to selective laser sintering, selective laser melting or electron beam melting, or any processes directly derived from said approaches.

A further aspect of the present invention relates to data processing apparatus configured to carry out the method as mentioned above. Said apparatus may e.g. be part of an additive manufacturing device hardware or an according monitoring or build processor unit.

A further aspect of the present invention relates to a computer program product comprising instructions which, when the program is executed by the data processing apparatus or a computer, cause it to carry out the method as described above.

A computer program product as referred to herein may relate to a computer program means constituting or comprising a storage medium like a memory card, a USB stick, a CD-ROM, a DVD or a file downloaded or downloadable from a server or network. Such product may be provided by a wireless communication network or via transfer of the corresponding information by the given computer program, computer program product or computer program means. A computer program product may further include a non-transitory computer-readable storage medium storing applications, programs, program modules, scripts, source code, program code, object code, byte code, compiled code, interpreted code, machine code, executable instructions, and/or the like. Such non-transitory computer-readable storage media include all computer-readable media (including volatile and non-volatile media).

Advantages and embodiments relating to the described method and/or the described computer program (product) may as well pertain or be valid with regard to an underlying data processing apparatus or additive manufacturing device.

BRIEF DESCRIPTION OF THE DRAWINGS

Further features, expediencies and advantageous embodiments become apparent from the following description of the exemplary embodiment in connection with the Figures.

DETAILED DESCRIPTION OF INVENTION

Figure 1:
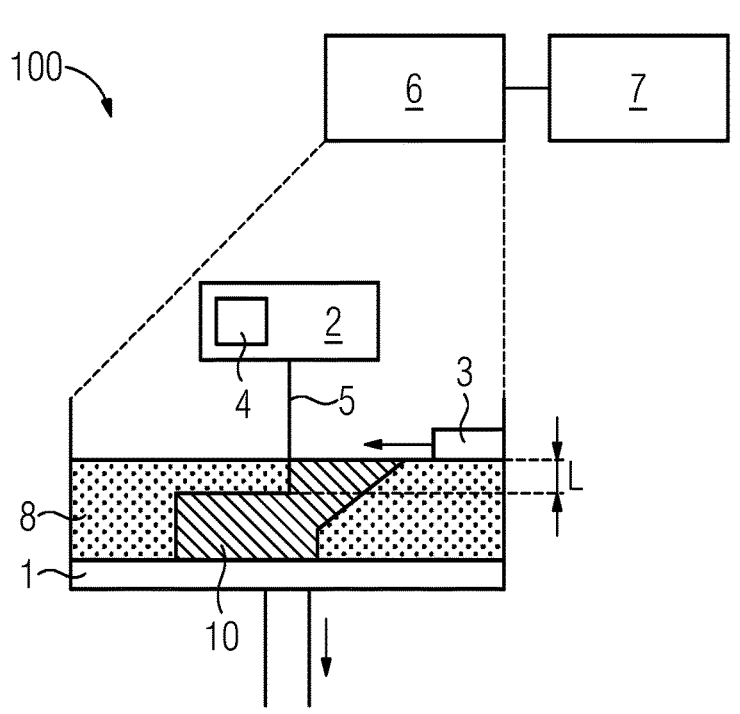
FIG. 1 shows a schematic sketch of the principle of a powder bed based additive manufacturing process.

Like elements, elements of the same kind and identically acting elements may be provided with the same reference numerals in the Figures. The Figures are not necessarily depicted true to scale and may be scaled up or down to allow for a better understanding of the illustrated principles. Rather, the described Figures are to be construed in a broad sense and as a qualitative base which allows a person skilled in the art to apply the presented teaching in a versatile way.

The term "and/or" as used herein shall mean that each of the listed elements may be taken alone or in conjunction with two or more of further listed elements.

FIG. 1 shows an additive manufacturing device 100. Said device 100 may be a conventional device for manufacturing any type of components by powder-bed-fusion (PBF). Such techniques employ a bed of a powder or base material 8 which is selectively and layerwise exposed to or irradiated by an energy beam 5, such as a laser or an electron beam of an irradiation apparatus or energy beam source 2. Accordingly, the given PBF method may relate to selective laser sintering, selective laser melting or electron beam melting. Said processes allow to establish a workpiece or part 10 on top of a build platform 1 in that powdery layers L for the part 10 are fused or welded onto said platform 1 and consecutively irradiated by selectively solidified by the beam 5 according to its predefined (CAD-)geometry. After the irradiation or fusing of each layer, the build platform 1 is usually lowered according to the layer thickness and a new base material layer is deposited on a manufacturing plane by a recoater or recoating device 30.

The irradiation apparatus 20 is connected to or may be controlled by a control device 4, e.g. comprising a build processor means.

The device 100 may further feature a, preferably optical, monitoring system 6, such as comprising a CCD- or sCMOS-camera or any other photodiode type imaging system with which layerwise images can be taken during the build job, such as one image after a powder recoating step and one image after an according (selective) laser scanning step. Particularly long exposure imaging in combination with a certain NIR (near infrared) filter or the like may be used to capture an intensity value of radiation emitted from the powder bed, like it is applied in optical tomography recordings.

The workpiece 10 as referred to herein may particularly relate to a part or an article of complex shape, such as with filigree portions of structures. Preferably, said part is made of a high-performance material, such as a material of great strength and/or thermal resistivity. Particularly, said part may constitute a part of a steam or gas turbine component, such as a blade, vane, shroud, shield, such as heat shield, tip, segment, insert, injector, seal, transition, burner, nozzle, strainer, orifice, liner, distributor, dome, boost, cone, lance, plate, resonator, piston or any corresponding retrofit kit. Alternatively, said component may relate to another or similar component.

Figure 2:
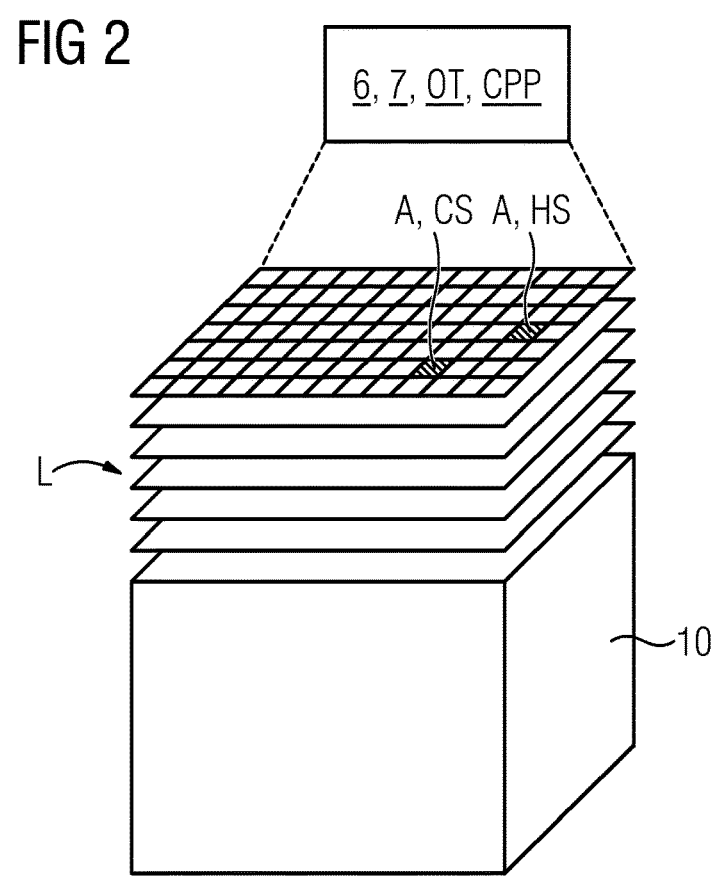
FIG. 2 indicates details of such a manufacturing process and particulars of an according anomaly detection applied during such manufacturing.

FIG. 2 indicates a schematic perspective view of a stack of layers L above a workpiece 10. The layer stack shall indicate subsequent layers L for the component 10 to be selectively irradiated or—as the case may be—optical images taken in order to detect anomalies in the process, be it in the powder layer or in the already (partly) solidified layer. The stack of layers as shown in FIG. 2 may as well relate to optical tomography data as set forth below. By way of the topmost layer of the stack as indicated in FIG. 2, an anomaly detection shall be illustrated. An anomaly may be indicated with reference numeral A.

It is shown that the optical monitoring system 6 may particularly detect, record or register different types of defects or anomalies, e.g. after a selective melting step has been carried out. In the upper right part of the topmost layer, particularly a hot spot HS shall be indicated, i.e. a region in the powder bed or structure for the workpiece 10 which has e.g. been overexposed by the energy beam 5. To this effect, a local or spatial energy density, brought in the powder bed may have been chosen too excessive as to result in a sufficient irradiation result. It is known that excessive heat causes powder particles to evaporate and may cause so-called "keyhole porosity" in the workpiece's structure, i.e. approximately spherical bubbles in the structure of the part (see FIG. 7 as well below).

It is apparent that a stable melting or irradiation process requires irradiation parameters to be selected in a reasonable process "window", i.e. a range of parameters which allow a good structural result, preferably without or poor in defects and anomalies. It is, of course, not only the energy parameter which can cause hot spots and other defects. Also, a material or the geometry of the workpiece itself (which is of course oversimplified in the scheme of FIG. 2) may lead to hotspots at corners of the contour of the workpiece, e.g. where the energy output is critical. It is known that the mere powder bed, e.g. surrounding solidified structures for the workpiece 10, is thermally "quasi-insulating" and excess heat needs to be dissipated via the build plate (not explicitly indicated in FIG. 2).

On the other hand, cold spots CS as indicated in the lower part of the topmost layer in FIG. 2 may arise. These cold spots CS may be attributed to an underexposed region, e.g. wherein the energy applied by beam 5 to the powder was not sufficient to fully and reliably melt the according powder bed regions. These cold spots CS may likewise result in an adverse structural quality, such as a residual porosity in the powder 8.

In general, the presented approach as well as the optical monitoring system 6 is capable of detecting a plurality of defects, such as the described hot spot HS, cold spots CS, an according overfused and/or an underfused region, but also so-called blob, or lack-of-fusion defects, in the buildup structure for the workpiece 10. All of the listed types of anomalies in the process may lead to scrap or waste of the whole component, particularly when the manufacture of high-performance materials is concerned. This leads in turn to a waste of manufacturing time and resources.

The mentioned optical monitoring system 6 may comprise a data processing apparatus 7 or computer. Said apparatus 7 may as well be mounted to said monitoring system 6. All process steps as described with regard to the presented correlation method may, thus, be carried out by a data processing device, such as the apparatus as depicted in FIG. 1 by reference numeral 7. To this effect, the presented method may be fully or partly implemented by generic data processing means.

Alternatively, said implementation may already be carried out by mainly a monitoring device e.g. comprising a camera or an optical tomography unit and computing module.

Figure 3:
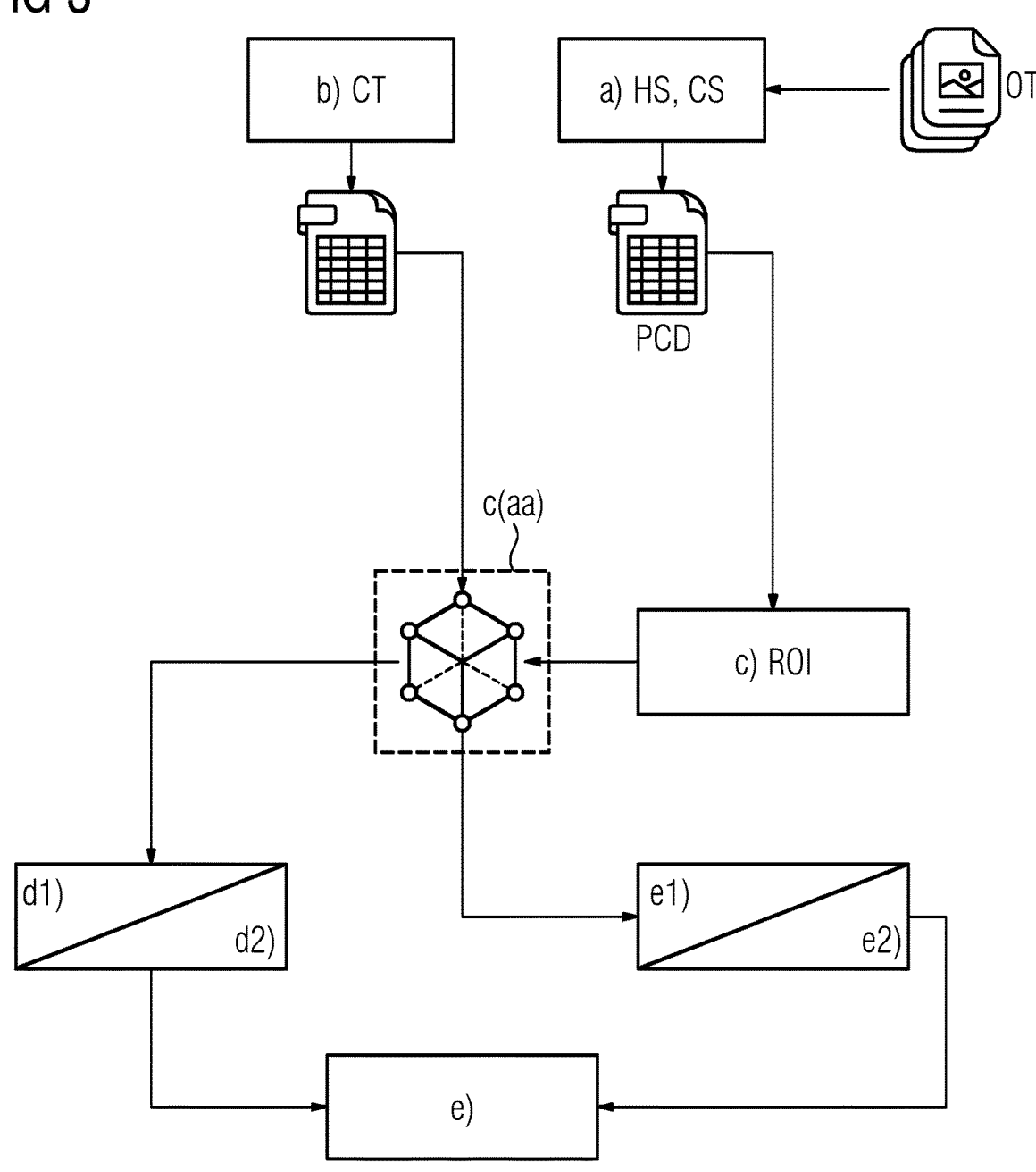
FIG. 3 indicates a simplified flow chart of process steps for the correlation methodology of the present invention.

FIG. 3 indicates a flow chart of the presented method steps. Said method is a computer-implemented method of correlating monitoring data and post-manufacturing inspection data in powder-bed-based additive manufacturing of a workpieces 10, as described above. The method comprises, a) providing monitoring data such as photographs, CCD camera records are optical tomography data OT. Said monitoring data preferably comprise anomaly or anomaly detection information HS, CS of a workpiece's geometry in a layerwise domain (cf. Figures described above).

Preferably, said process monitoring data OT are provided as unstructured data, such as in form of a point cloud or point cloud data PCD structure. Additionally or alternatively said monitoring data may be present in a layerwise data domain or structure. The anomaly detection information HS, CS or other anomalies as mentioned in FIG. 2 above may be detected, filtered or derived from the monitoring data records or images, such as by combination of machine learning ML and according image processing algorithms, like thresholding algorithms (cf. FIG. 10 below). Furthermore, said anomaly detection information HS, CS may comprise a location, a size and a severity of the accordingly detected anomaly A.

The Method further comprises, b) providing inspection data, such as computed tomography CT data with information about a detected defect D of the workpiece's structure. Said defect D is preferably detected in a post-manufacturing inspection procedure, such as a mechanical cut, the computed tomography inspection method or the like. According to the nature of the inspection data, such as in the case of computed tomography information, said defect information is preferably present in a volumetric domain. Said defect information of the inspection data may as well relate to a porosity P or lack of fusion defect of the workpiece's structure.

The just described two different data inputs of the methodology are shown at the top of the workflow as indicated in FIG. 3. Even though this is not explicitly indicated, further (optional) information may be processed in the workflow, such as meta data or user-defined data which may e.g. be given manually as an input. Said meta data may as well contain information about a pixel size of the monitoring recording, a layer thickness and an overlapping layers span. This latter parameter indicates e.g. how many layers in combination must be used or considered in order to compare and correlate with any inspection data, as will be described in more detail in FIG. 6 below. Usually said overlapping layers span depends on the corresponding meltpool depth for selectively welded, thus 3D printed, material and its printing parameters. Further parameters which may be input or considered relate to an optional coordinates adjustment, such as a rotation angle, or anomaly positions of the respective region-of-interest coordinates. After the extraction of a region-of-interest ROI information, as described under method step c), spatial coordinates for the region-of-interest ROI of the monitoring data may optionally be adjusted, as shall be indicated by c(aa). Said adjustment may relate to a geometric adjustment.

As indicated in the bottom left part of FIG. 3, the method then comprises alternatively the steps d1) and d2).

Step d1) indicates transforming the defect information D of the inspection data CT from the volumetric domain into the layerwise domain.

On the contrary, step d2) indicates transforming the anomaly information HS, CS of the monitoring data OT from the layerwise domain into the volumetric domain.

Apparently said alternative transformation or conversion steps bring the underlying data domains in accordance and thus expediently allow to proceed with the computation of spatial overlap parameters, as set forth below. The choice of one of the mentioned transforming steps may be carried out automatically or semi-automatically.

For the computation of the spatial overlap Ao under step e) further below, as well either a pixel-wise e1) or a region-wise overlapping e2) type of analysis may be carried out. This will be described in detail further below in FIGS. 4 to 6. In fact, said decision between e1) and e2) may implemented by a filter functionality, i.e. in an automated, semiautomated or manual way. The respective choice may be given by a meta data input such as based on the layer thickness information; or the above-mentioned overlapping layer span, as well by an automated decision, classification, prediction or simulation of a required or expected computation effort and/or computing time of the overall correlation methodology.

The defect pixel-wise overlapping offers more accurate information than the region-wise overlapping analysis. However, the pixel-wise approach is slower in computing and less time efficient. In the pixel-wise method, the pixels that occur in consecutive layers (cf. overlapping layers span) remains in data flow and other non-consecutive occurring pixels get filtered. And for the region-wise method, the defects that occur in consecutive layers remain in the data flow for further processing and other get eliminated or cropped.

The method further comprises, e), computing a spatial overlap Ao of the monitoring data of interest and the transformed inspection data as shown at the very bottom of the workflow of FIG. 3. Once the spatial overlap or similar or equivalent parameter is calculated, further parameters, such as a defect volume, a defect number, number of pores are pore and/or an overlapping volume for the correlation may be derived.

Figure 4:
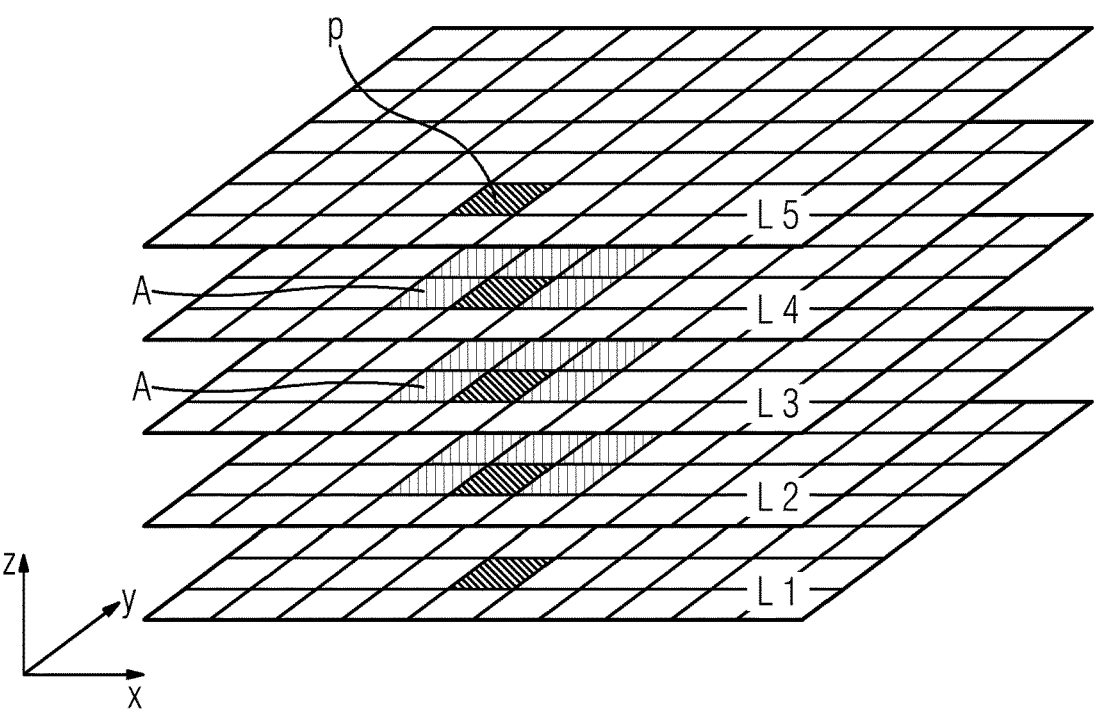
FIG. 4 indicates in a simplified perspective view of a stack of process monitoring images and according anomalies in a layerwise domain.

The pixel-wise overlapping approach is shown in more detail in FIG. 4. Particularly, five consecutive layers or layers of images are shown in a perspective view one above the other. All of the layers extend in the x, y direction and are stacked in the z-direction as indicated at the bottom left.

Reference numeral p indicates the actual pixel position as a guidance to the eye. An anomaly, as indicated by the dark shades and numeral A in the stack occurs in the three layers in the middle. In each case six pixels are affected. When assuming e.g. s thresholding-based image processing approach for the anomaly detection, one can accurately encompass the actual anomaly pixel-wise in the layer stack, provided that an overlapping layers span of larger than two is selected.

Figure 5:
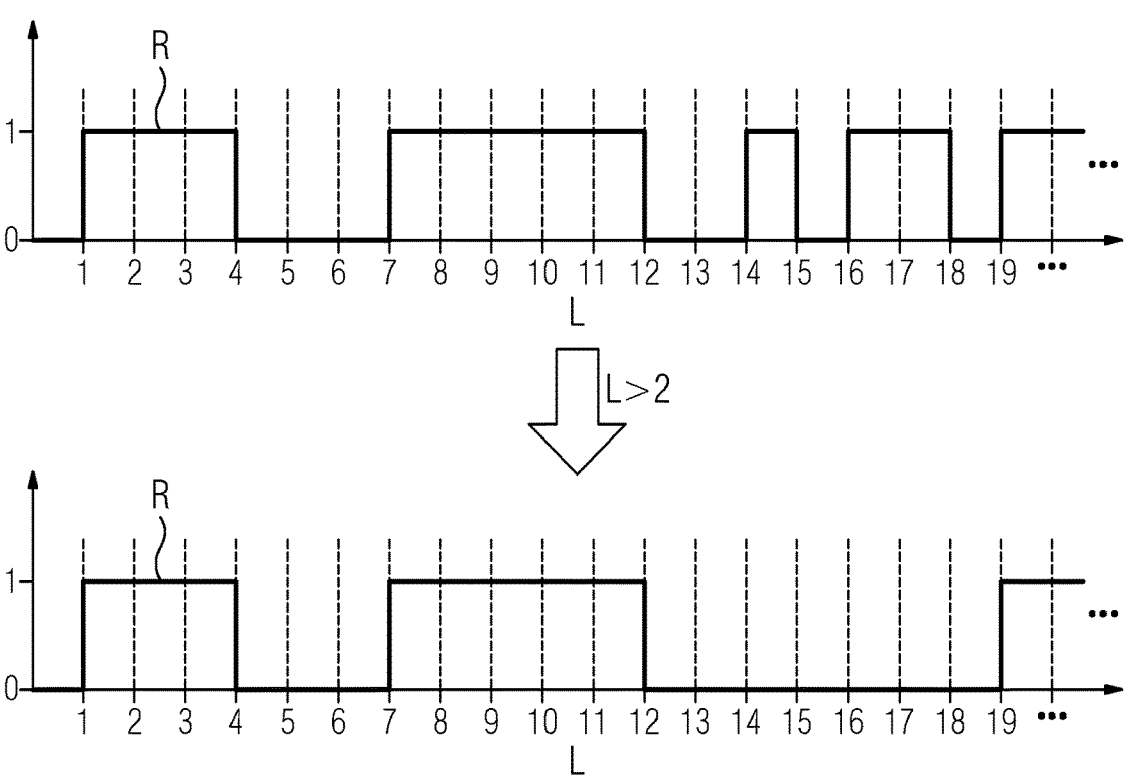
FIG. 5 comprises two schematics, respectively indicating the pixel-wise defect monitoring over a stack of layers.

To further illustrate the situation, FIG. 5 indicates at the top, a diagram with 2 states, i.e. values 0 and 1 put on the y-axis or the number of layers on the x-axis. It is particularly shown that a signal may have exemplarily be detected between consecutive layers from 1 to 4, as was indicated in FIG. 5. Further exemplary signals are indicated for a stack of up to 19 layers.

At the bottom, as compared to the top view, a different situation is shown, wherein particularly the layers between 13 and 18 differ in the anomaly detection, such as at the different location of the part or anomaly at issue.

Figure 6:
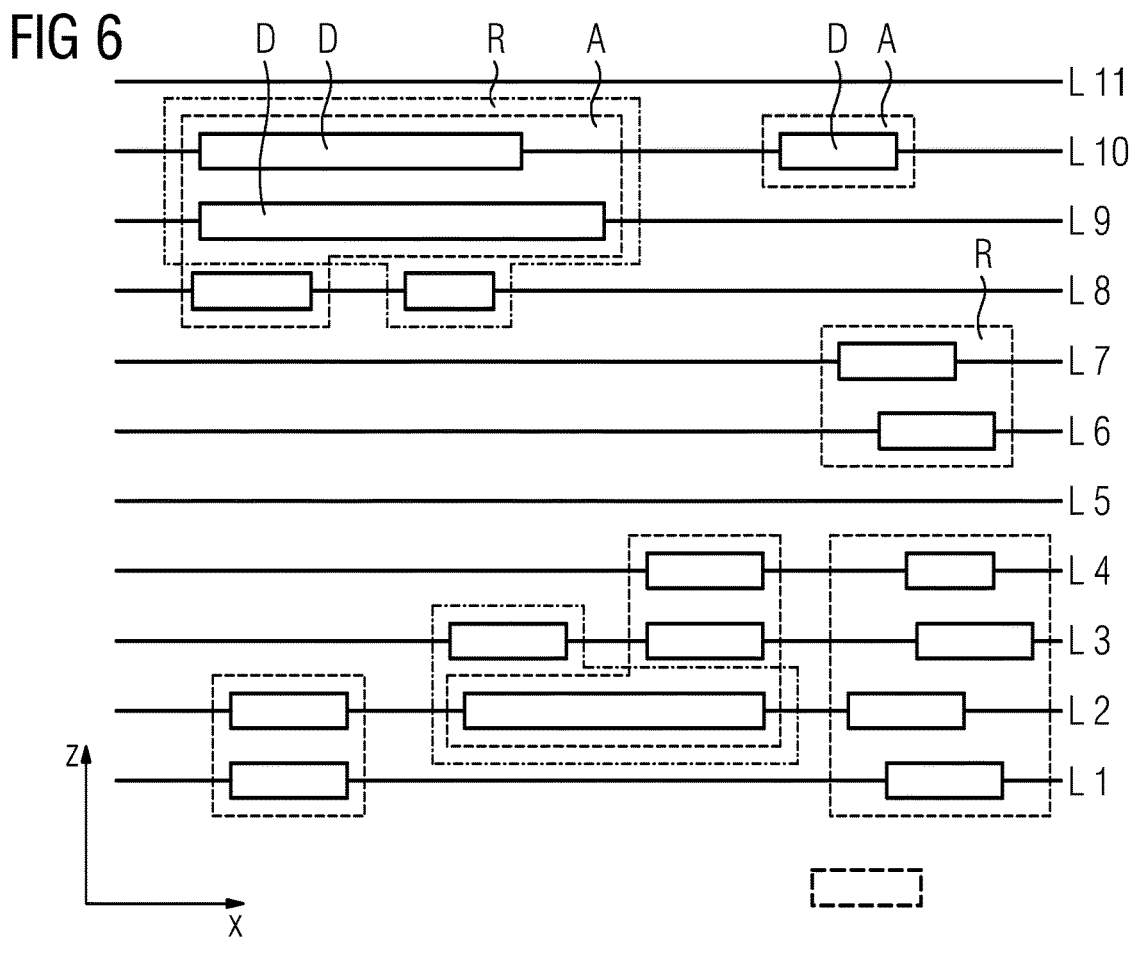
FIG. 6 schematically indicates, by way of a cross-section of a stack of layers including anomalies as well as defects, an overlapping approach of the present invention.

FIG. 6 indicates, on the contrary, the region-wise overlapping approach as introduced above. For conventional LPBF process monitoring systems, only data from the current top layer can be detected, whereas real material defects may be located beneath the actual layer number. As the laser beam or electron beam, penetrates with the energy input and the resulting meltpool usually more than one layer (thickness), like two or three layer thicknesses depending on the parameter settings effective for the anomaly detection. This aspect can be considered by setting a minimum number of layers where patterns must be present at the same locations. This is achieved, as described above, by the overlapping layers span which is, also in FIG. 6, chosen to be larger than two, if the laser penetrates at least through to consecutive layers. This situation is shown at the bottom left (in layers L1 and L2) in FIG. 6 and in the middle on the right (in layers L6 and L7) thereof.

In FIG. 6, the dashed lines shall indicate the underlying region R assumed for the overlapping. Said regions R extend usually over a small number of consecutive layers L and ideally surround or encompass one or a plurality of defects D.

Otherwise, without such selection of the overlapping layers span, there would be the danger to record artifacts or random defects which do not relate to a real defect, void, or over- or underexposed region, and should therefore not be detected at all. In layers L1 to L4 in the bottom right region of FIG. 6, e.g. the mentioned overlapping layers span has to be chosen to at least a value of 4.

Figure 7:
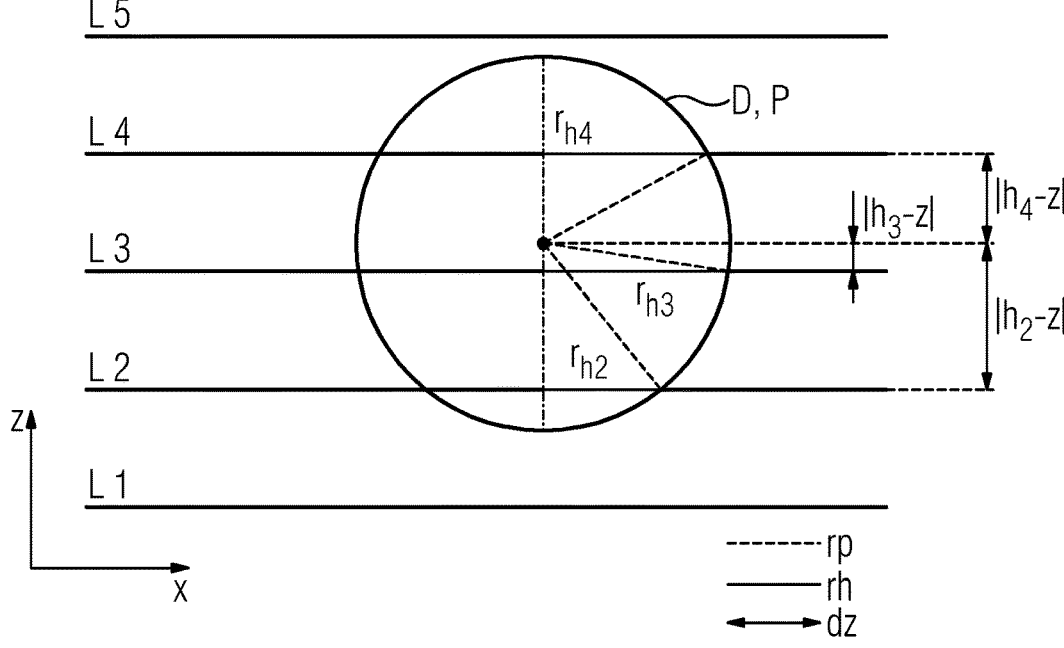
FIG. 7 indicates similar to FIG. 6 particulars of a data domain conversion for the presented correlation method.
Figure 8:
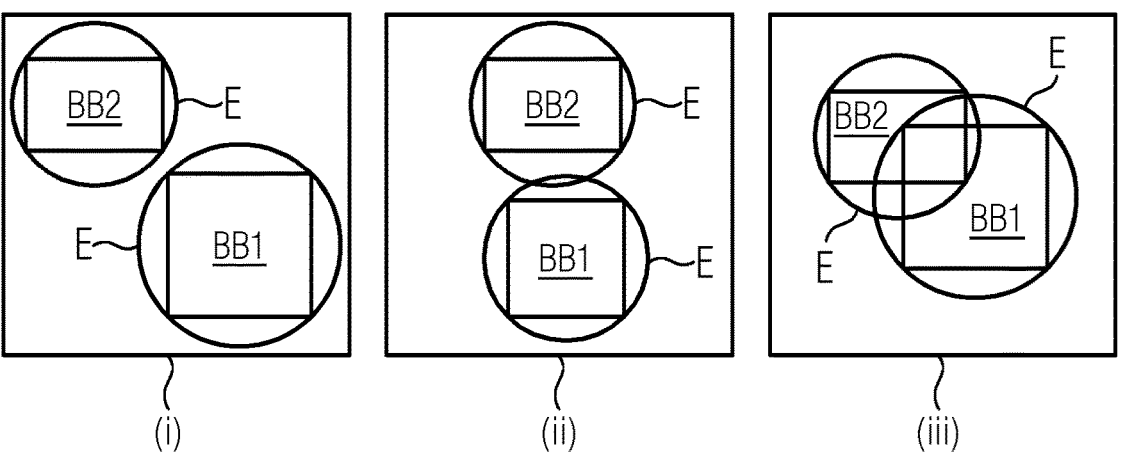
FIG. 8 indicates by way of three different situations, the basic idea of an overlapping computation according to the present invention.

In FIGS. 7 and 8 the data domain conversion or transformation as mentioned above by way of method steps d1) and d2) in indicated in more detail. The circle in the middle shall depict a (spherical) defect or pore P, which may usually as well be detected by the described process monitoring in a plurality of consecutive layers. In the given example, said defect D extends for roughly three layer thicknesses, wherein the parameter rs indicates a given slice radius, the parameter rh indicates an according pore radius, and dz shall indicate a z-distance. It is particularly indicated, how the presented methodology may derive layer heights and determine the resulting two-dimensional pore positions and radii by simple arithmetics.

Figure 9:
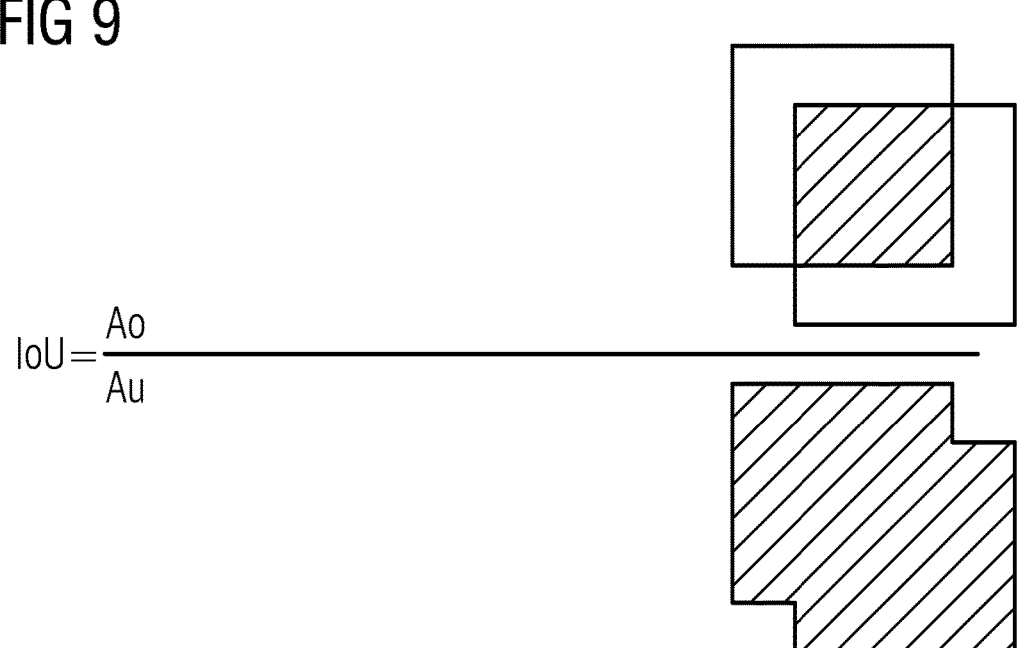
FIG. 9 shows a schematic of further details of the presented overlapping computation.

FIGS. 8 and 9 further indicate that the computation of the overlap Ao is preferably supported by defining a bounding box BB1, BB2 of the monitoring data A, OT and the inspection data each. By way of said bounding boxes BB1, BB2, the overlap is calculated via an area-of-overlap Ao and/or an area-of-union Ao of the monitoring data A, OT and the inspection data CT, respectively. Particularly, schematic depicts three situations (i), (ii) and (iii). The first bounding box BB1 may indicate the corresponding boundaries in the layerwise domain of the monitoring data A, OT, whereas the second bounding box BB2 may indicate those boundaries of the volumetric domain of the inspection data CT. Said bounding boxes are each encircled by a round estimation or localisation E which surrounds the square-shaped bounding boxes or, as the case may be, the anomalies and defects.

In (i), a situation is shown, where no overlap is detected at all.

In (ii), a situation is shown where no real defect anomaly overlap is shown but only a simple or virtual overlap by slightly overlapping boundary boxes BB1 and BB2.

In (iii), a situation is shown with real overlapping square-shaped domains. Thus, of course also the given boundary boxes overlap in parts.

A situation is similar to the described situation (iii) as indicated in FIG. 9, introducing a so-called intersection-of-overlap IoU. Said intersection-of-overlap equals to the quotient of the area-of-overlap Ao and the area-of-union Au, which are both further illustrated by the pictograms on the right side of FIG. 9. These parameters as well as further derivatives of these calculations particularly allow for the inventive advantages of the present invention.

Figure 10:
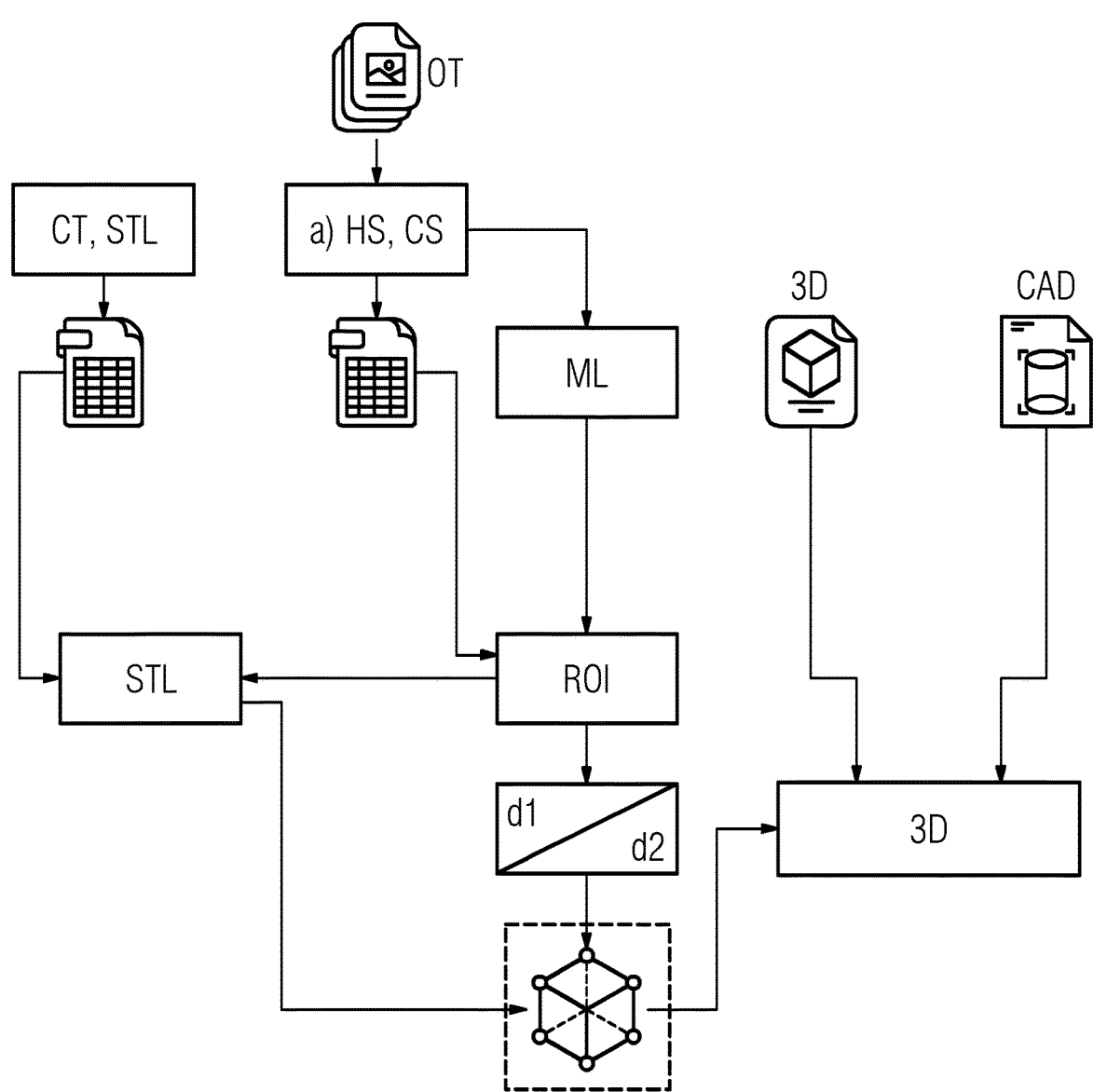
FIG. 10 indicates a simplified flow chart of process steps for visualization aspects of the correlation methodology of the present invention.

A further workflow similar and in addition to the one shown in FIG. 3 is shown in FIG. 10. This chart rather concentrates on the 3D-visualisation of the data generated from the mentioned multiple input sources as described herein (cf. top of FIG. 10). The analyzed data that contains predicted defects information from can be visualized at the same time with real material defects. Along with that, geometrical calculations can be made by comparing 3D scanned model with CAD model and layerwise OT image data, which is particularly shown at the bottom on the right of FIG. 10. Numeral "3D" on the right shall indicate, that with the given visualization, in addition, an in-depth knowledge about the improvement of dimensional accuracy of additive manufactured components may be gathered.

In particular and in excess to the details as already described by way of the workflow of FIG. 3, it is shown that the inspection data CT may further be converted into an STL or a VRML format, or any other format native to computer-aided-design CAD, as indicated by the numeral "STL" in the left part of the sketch of FIG. 10.

Furthermore, inter alia, the monitoring data OT are automatically cropped and only the extracted region-of-interest information is further mapped, as indicated by numeral ROI. For the transforming, as mentioned above, either a voxel-to-pixel conversion or a pixel-to-voxel conversion is carried out with the mapped monitoring data. The flow of steps of FIG. 10 may further comprise a 3D data conversion, reconstruction and, finally the visualisation of the correlated data.

The invention claimed is:

1. A computer-implemented method of correlating monitoring data and post-manufacturing inspection data in powder-bed-based additive manufacturing of workpieces comprising:

(a) providing monitoring data (A, OT) comprising anomaly detection information (HS, CS) of a workpiece's geometry in a layerwise domain, wherein the monitoring data are provided as unstructured data, and the anomaly detection information (HS, CS) comprises a location (x, y), a size and a severity of a detected anomaly (A), (b) providing inspection data (CT) comprising defect information (D) of the workpiece's geometry in a volumetric domain, wherein the inspection data comprise computed tomography (CT) data and the defect information indicates a porosity (P) or lack of fusion defect of a workpiece's structure, (c) extracting a region-of-interest (ROI) information from the monitoring data (A, OT), by either (d1) transforming the defect information (D) of the inspection data (CT) from the volumetric domain into the layerwise domain, or (d2) transforming the anomaly detection information (HS, CS) of the monitoring data (A, OT) from the layerwise domain into the volumetric domain, and (e) computing a spatial overlap (Ao) of the monitoring data of interest and the transformed inspection data, and performing a 3D conversion, reconstruction and visualization of the correlated data.

2. The method according to claim 1, wherein an anomaly relates to a hot spot (HS), a cold spot (CS), a blob defect, an overexposed and/or an underexposed region detected via monitoring during a manufacture of the workpiece.

3. The method according to claim 1, wherein an anomaly (A) is detected using a combination of machine learning (ML) and image processing algorithms.

4. The method according to claim 1, wherein, for the computation of the spatial overlap (Ao), either a pixel-wise (e1) or a region-wise overlapping (e2) type of analysis is carried out.

5. The method according to claim 1, wherein, after the extraction of the region-of-interest (ROI) information, spatial coordinates for the region-of-interest (ROI) of the monitoring data (A, OT) are adjusted (c(aa)).

6. The method according to claim 1, wherein the computation of the spatial overlap (Ao) is supported by defining a bounding box (BB1, BB2) of the monitoring data (A, OT) and the inspection data each, and, by way of said bounding boxes (BB1, BB2), the spatial overlap is calculated via an area-of-overlap (Ao) and/or an area-of-union (Ao) of the monitoring data (A, OT) and the inspection data (CT), respectively.

7. The method according to claim 1, wherein the inspection data (CT) are converted into an STL or a VRML format, or any other format native to computer-aided-design (CAD).

8. The method according to claim 1, wherein the monitoring data (A, OT) are automatically cropped and only the extracted region-of-interest information is further mapped.

9. The method according to claim 8, wherein, for the transforming, either a voxel-to-pixel conversion or a pixel-to-voxel conversion is carried out with the mapped monitoring data.

10. The method according to claim 1, wherein the powder bed based additive manufacture relates to selective laser sintering, selective laser melting or electron beam melting.

11. A data processing apparatus configured to carry out the method of claim 1, wherein said apparatus forms part of or is configured to be coupled to an additive manufacturing hardware or according monitoring system.

12. A non-transitory computer readable medium including a computer program product stored thereon, comprising:

instructions which, when executed by a data processing apparatus or a computer, cause the data processing apparatus or computer to carry out the method of claim 1.

13. The method according to claim 1, wherein the unstructured data is in the form of a point cloud (PC).

* * * * *